US012567001B2

(12) United States Patent
Cooper et al.

(10) Patent No.: US 12,567,001 B2
(45) Date of Patent: Mar. 3, 2026

(54) MACHINE LEARNING GENERATION FOR REAL-TIME LOCATION

(71) Applicant: DENSO CORPORATION, Kariya (JP)

(72) Inventors: Kyle Cooper, Plainwell, MI (US); Eric Smith, Holland, MI (US)

(73) Assignee: DENSO CORPORATION, Kariya-City (JP)

( * ) Notice: Subject to any disclaimer, the term of this patent is extended or adjusted under 35 U.S.C. 154(b) by 658 days.

(21) Appl. No.: 18/095,048

(22) Filed: Jan. 10, 2023

(65) Prior Publication Data

US 2023/0244994 A1      Aug. 3, 2023

Related U.S. Application Data

(60) Provisional application No. 63/306,224, filed on Feb. 3, 2022.

(51) Int. Cl.
| | |
|---|---|
| *B60R 25/24* | (2013.01) |
| *G06N 20/00* | (2019.01) |
| *B60R 25/01* | (2013.01) |

(52) U.S. Cl.
CPC ........... *G06N 20/00* (2019.01); *B60R 25/245* (2013.01); *B60R 25/01* (2013.01)

(58) Field of Classification Search
CPC .......... G06N 20/00; G06N 5/01; G06N 20/20; B60R 25/245; B60R 25/01
See application file for complete search history.

(56) References Cited

U.S. PATENT DOCUMENTS

| | | | |
|---|---|---|---|
| 5,515,419 | A | 5/1996 | Sheffer |
| 6,069,411 | A | 5/2000 | Charron |
| 6,211,776 | B1 | 4/2001 | Röhrl et al. |
| 6,218,932 | B1 | 4/2001 | Stippler |
| 6,259,168 | B1 | 7/2001 | Okada |
| 6,522,027 | B1 | 2/2003 | Morillon et al. |
| 6,556,135 | B2 | 4/2003 | Attring et al. |
| 6,697,024 | B2 | 2/2004 | Fuerst et al. |
| 6,906,612 | B2 | 6/2005 | Ghabra et al. |
| 6,965,295 | B2 | 11/2005 | Shimonomoto et al. |

(Continued)

FOREIGN PATENT DOCUMENTS

| | | |
|---|---|---|
| EP | 1365613 | 6/2006 |
| JP | 2003-248045 | 9/2003 |

(Continued)

OTHER PUBLICATIONS

Dahlgren, Erik et al., "Evaluation of indoor positioning based on Bluetooth Smart technology", Chalmers University of Technology, Department of Computer Science and Engineering, Jun. 10, 2014, pp. 1-94.

(Continued)

*Primary Examiner* — Nay Tun
(74) *Attorney, Agent, or Firm* — Warner Norcross + Judd LLP

(57) ABSTRACT

A system and method for determining location information of a portable device relative to an object is provided. In one embodiment, aspects of the system to determine location with respect to the portable device may be transferred to another system for training that system to determine location with respect to the portable device or another type of portable device.

18 Claims, 6 Drawing Sheets

(56) References Cited

U.S. PATENT DOCUMENTS

| | | | |
|---|---|---|---|
| 6,980,124 B2 | 12/2005 | Kong et al. | |
| 7,046,119 B2 | 5/2006 | Ghabra et al. | |
| 7,089,035 B2 | 8/2006 | Ando et al. | |
| 7,106,171 B1 | 9/2006 | Burgess | |
| 7,170,988 B2 | 1/2007 | McLintock et al. | |
| 7,224,980 B2 | 5/2007 | Hara | |
| 7,228,122 B2 | 6/2007 | Oyagi et al. | |
| 7,277,007 B2 | 10/2007 | John et al. | |
| 7,280,097 B2 | 10/2007 | Chen et al. | |
| 7,289,786 B2 | 10/2007 | Krasner | |
| 7,321,814 B2 | 1/2008 | Kanda et al. | |
| 7,333,021 B2 | 2/2008 | Teda et al. | |
| 7,394,349 B2 | 7/2008 | Marek et al. | |
| 7,446,644 B2 | 11/2008 | Schaffzin et al. | |
| 7,530,113 B2 | 5/2009 | Braun | |
| 7,548,491 B2 | 6/2009 | Macfarlane | |
| 7,629,873 B2 | 12/2009 | Ghabra et al. | |
| 7,663,502 B2 | 2/2010 | Breed | |
| 7,710,245 B2 | 5/2010 | Pickering | |
| 7,751,957 B2 | 7/2010 | Nagaoka et al. | |
| 7,768,377 B2 | 8/2010 | Brey | |
| 7,805,169 B2 | 9/2010 | Hicks, III | |
| 7,850,078 B2 | 12/2010 | Christenson et al. | |
| 7,868,745 B2 | 1/2011 | Schmidt et al. | |
| 7,904,219 B1 | 3/2011 | Lowrey et al. | |
| 7,911,358 B2 | 3/2011 | Bos et al. | |
| 7,912,625 B2 | 3/2011 | Cahoon | |
| 7,916,021 B2 | 3/2011 | Lickfelt et al. | |
| 7,932,892 B2 | 4/2011 | Chen et al. | |
| 7,961,076 B2 | 6/2011 | Kelley et al. | |
| 7,999,655 B2 | 8/2011 | Yoshikawa | |
| 8,022,808 B2 | 9/2011 | Kurpinski et al. | |
| 8,048,174 B2 | 11/2011 | Yamamichi et al. | |
| 8,050,817 B2 | 11/2011 | Moinzadeh et al. | |
| 8,053,922 B2 | 11/2011 | Müller | |
| 8,077,011 B2 | 12/2011 | McBride et al. | |
| 8,089,339 B2 | 1/2012 | Mikan et al. | |
| 8,089,342 B2 | 1/2012 | Sugiura et al. | |
| 8,098,130 B2 | 1/2012 | Baruco et al. | |
| 8,102,239 B2 | 1/2012 | Woo | |
| 8,115,609 B2 | 2/2012 | Ketari | |
| 8,126,400 B2 | 2/2012 | Jung et al. | |
| 8,126,450 B2 | 2/2012 | Howarter et al. | |
| 8,127,984 B2 | 3/2012 | Zatloukal et al. | |
| 8,159,324 B2 | 4/2012 | Zellweger et al. | |
| 8,175,613 B2 | 5/2012 | Patil et al. | |
| 8,175,657 B2 | 5/2012 | Okayasu | |
| 8,193,903 B2 | 6/2012 | Kraimer et al. | |
| 8,224,313 B2 | 7/2012 | Howarter et al. | |
| 8,245,052 B2 | 8/2012 | Bjorn | |
| 8,248,968 B2 | 8/2012 | Handforth et al. | |
| 8,284,022 B2 | 10/2012 | Kachouh | |
| 8,299,895 B2 | 10/2012 | Harris | |
| 8,319,605 B2 | 11/2012 | Hassan et al. | |
| 8,334,758 B2 | 12/2012 | Baruco et al. | |
| 8,358,197 B2 | 1/2013 | Tran | |
| 8,421,589 B2 | 4/2013 | Sultan et al. | |
| 8,427,289 B2 | 4/2013 | Ghabra et al. | |
| 8,432,260 B2 | 4/2013 | Talty et al. | |
| 8,437,886 B1 | 5/2013 | Yang | |
| 8,437,916 B2 | 5/2013 | Fawaz et al. | |
| 8,482,382 B2 | 7/2013 | Lickfelt et al. | |
| 8,494,447 B2 | 7/2013 | Desterling et al. | |
| 8,527,015 B2 | 9/2013 | Alrabady et al. | |
| 8,610,674 B2 | 12/2013 | Pryor | |
| 8,706,143 B1 | 4/2014 | Elias | |
| 8,744,482 B2 | 6/2014 | Margalef et al. | |
| 8,868,254 B2 | 10/2014 | Louboutin | |
| 8,947,202 B2 | 2/2015 | Tucker et al. | |
| 9,241,235 B2 | 1/2016 | Santavicca | |
| 9,536,364 B2 | 1/2017 | Talty et al. | |
| 9,736,649 B1 | 8/2017 | Do et al. | |
| 9,852,560 B2 | 12/2017 | Bauman et al. | |
| 9,886,805 B1 | 2/2018 | Bianchi, III et al. | |
| 9,894,492 B1 | 2/2018 | Elangovan et al. | |
| 9,964,468 B1 | 5/2018 | Wu et al. | |
| 10,070,325 B2 | 9/2018 | Logothetis | |
| 10,087,672 B2 | 10/2018 | Kalhous et al. | |
| 10,285,013 B2 * | 5/2019 | Ledvina | H04W 4/023 |
| 10,319,247 B2 | 6/2019 | Bietz et al. | |
| 10,328,898 B2 | 6/2019 | Golsch et al. | |
| 10,356,550 B2 | 7/2019 | Smith et al. | |
| 10,748,109 B2 | 8/2020 | Benjamin et al. | |
| 10,757,248 B1 * | 8/2020 | Qian | H04W 4/44 |
| 10,803,687 B1 * | 10/2020 | Khamis | G07C 9/00309 |
| 10,904,695 B2 | 1/2021 | Knobloch | |
| 2001/0054952 A1 | 12/2001 | Desai et al. | |
| 2002/0140545 A1 | 10/2002 | Nietupski et al. | |
| 2002/0186144 A1 | 12/2002 | Meunier | |
| 2003/0090365 A1 | 5/2003 | Bergerhoff | |
| 2003/0117293 A1 | 6/2003 | Tang et al. | |
| 2003/0135321 A1 | 7/2003 | Kumazaki et al. | |
| 2004/0201277 A1 | 10/2004 | Hentsch et al. | |
| 2004/0257209 A1 | 12/2004 | Yang | |
| 2005/0038574 A1 | 2/2005 | Gila et al. | |
| 2005/0046554 A1 | 3/2005 | Attaprasith | |
| 2005/0099263 A1 | 5/2005 | Ikeda | |
| 2005/0130677 A1 | 6/2005 | Meunier et al. | |
| 2005/0192056 A1 | 9/2005 | Karaki | |
| 2005/0225429 A1 | 10/2005 | Burzio | |
| 2005/0242923 A1 | 11/2005 | Pearson et al. | |
| 2005/0266855 A1 | 12/2005 | Zeng et al. | |
| 2006/0061459 A1 | 3/2006 | Kawamura et al. | |
| 2006/0135216 A1 | 6/2006 | Collavo et al. | |
| 2006/0164207 A1 | 7/2006 | Wilcox | |
| 2006/0238297 A1 | 10/2006 | Tang et al. | |
| 2007/0109093 A1 | 5/2007 | Matsubara et al. | |
| 2007/0142155 A1 | 6/2007 | Schumaher | |
| 2007/0162191 A1 | 7/2007 | Matsubara et al. | |
| 2007/0176739 A1 | 8/2007 | Raheman | |
| 2007/0197261 A1 | 8/2007 | Humbel | |
| 2007/0281735 A1 | 12/2007 | Suzuki | |
| 2008/0068128 A1 | 3/2008 | Ghabra et al. | |
| 2008/0136611 A1 | 6/2008 | Benco et al. | |
| 2008/0143499 A1 | 6/2008 | Shimomura | |
| 2008/0147268 A1 | 6/2008 | Fuller | |
| 2008/0194291 A1 | 8/2008 | Martin et al. | |
| 2008/0197970 A1 | 8/2008 | Fouts | |
| 2008/0197987 A1 | 8/2008 | King et al. | |
| 2008/0204322 A1 | 8/2008 | Oswald et al. | |
| 2008/0258868 A1 | 10/2008 | Nakajima et al. | |
| 2008/0266174 A1 | 10/2008 | Medina Herrero | |
| 2008/0309453 A1 | 12/2008 | Kim et al. | |
| 2009/0115585 A1 | 5/2009 | Minassian | |
| 2009/0146830 A1 | 6/2009 | Ogiso | |
| 2009/0156126 A1 | 6/2009 | Willis | |
| 2009/0167524 A1 | 7/2009 | Chesnutt et al. | |
| 2009/0195370 A1 | 8/2009 | Huffman et al. | |
| 2009/0212905 A1 | 8/2009 | Batz et al. | |
| 2009/0286548 A1 | 11/2009 | Coronel et al. | |
| 2009/0289780 A1 | 11/2009 | Tenorio-Fox | |
| 2009/0291637 A1 | 11/2009 | Alrabady et al. | |
| 2009/0328189 A1 | 12/2009 | Budyta et al. | |
| 2010/0017118 A1 | 1/2010 | Dougherty | |
| 2010/0026578 A1 | 2/2010 | Furnanz et al. | |
| 2010/0063670 A1 | 3/2010 | Brzezinski et al. | |
| 2010/0076622 A1 | 3/2010 | Dickerhoof et al. | |
| 2010/0087137 A1 | 4/2010 | Fischer et al. | |
| 2010/0097178 A1 | 4/2010 | Pisz et al. | |
| 2010/0102924 A1 | 4/2010 | King et al. | |
| 2010/0109914 A1 | 5/2010 | Tieman et al. | |
| 2010/0135178 A1 | 6/2010 | Aggarwal et al. | |
| 2010/0136944 A1 | 6/2010 | Taylor et al. | |
| 2010/0141506 A1 | 6/2010 | Gulden et al. | |
| 2010/0185537 A1 | 7/2010 | Bari | |
| 2010/0222940 A1 | 9/2010 | Pütsch | |
| 2010/0238862 A1 | 9/2010 | Davidson et al. | |
| 2010/0265034 A1 | 10/2010 | Cap et al. | |
| 2010/0323715 A1 | 12/2010 | Winters | |
| 2011/0045842 A1 | 2/2011 | Rork et al. | |
| 2011/0060480 A1 | 3/2011 | Mottla et al. | |
| 2011/0086668 A1 | 4/2011 | Patel | |
| 2011/0112969 A1 | 5/2011 | Zaid et al. | |
| 2011/0142100 A1 | 6/2011 | Farmer et al. | |

(56)  References Cited

U.S. PATENT DOCUMENTS

| | | |
|---|---|---|
| 2011/0165896 A1 | 7/2011 | Stromberg et al. |
| 2011/0169604 A1 | 7/2011 | Ghabra et al. |
| 2011/0215901 A1 | 9/2011 | Van Wiemeersch et al. |
| 2011/0275321 A1 | 11/2011 | Zhou et al. |
| 2012/0105197 A1 | 5/2012 | Kobres |
| 2012/0126943 A1 | 5/2012 | Biondo et al. |
| 2012/0129493 A1 | 5/2012 | Vasudevan |
| 2012/0164989 A1 | 6/2012 | Xiao et al. |
| 2012/0208519 A1 | 8/2012 | Seaver |
| 2012/0229253 A1 | 9/2012 | Kolar |
| 2012/0268259 A1 | 10/2012 | Igel et al. |
| 2012/0281565 A1 | 11/2012 | Sauer |
| 2012/0282913 A1 | 11/2012 | Kaindl et al. |
| 2012/0309314 A1 | 12/2012 | Chen et al. |
| 2012/0310446 A1 | 12/2012 | Murphy |
| 2012/0313768 A1 | 12/2012 | Campbell et al. |
| 2012/0313796 A1 | 12/2012 | Lee et al. |
| 2012/0329445 A1 | 12/2012 | Elliott |
| 2013/0015814 A1 | 1/2013 | Kelty et al. |
| 2013/0031598 A1 | 1/2013 | Whelan et al. |
| 2013/0082820 A1 | 4/2013 | Tieman |
| 2013/0099892 A1 | 4/2013 | Tucker et al. |
| 2013/0099896 A1 | 4/2013 | Arkko et al. |
| 2013/0103200 A1 | 4/2013 | Tucker et al. |
| 2013/0106602 A1 | 5/2013 | Lickfelt |
| 2013/0109342 A1 | 5/2013 | Welch |
| 2013/0130674 A1 | 5/2013 | De Wind et al. |
| 2013/0141212 A1 | 6/2013 | Pickering |
| 2013/0154819 A1 | 6/2013 | Stefanovski et al. |
| 2013/0194068 A1 | 8/2013 | Mönig et al. |
| 2013/0211623 A1 | 8/2013 | Thompson et al. |
| 2013/0237189 A1 | 9/2013 | Nishidai |
| 2013/0257604 A1 | 10/2013 | Mirle et al. |
| 2013/0259232 A1 | 10/2013 | Petel |
| 2013/0271273 A1 | 10/2013 | Oesterling |
| 2013/0332007 A1 | 12/2013 | Louboutin |
| 2014/0025950 A1 | 1/2014 | Peeters et al. |
| 2014/0169564 A1 | 6/2014 | Gautama et al. |
| 2014/0185520 A1 | 7/2014 | Gao et al. |
| 2014/0188309 A1 | 7/2014 | Caratto et al. |
| 2014/0188348 A1 | 7/2014 | Gautama et al. |
| 2014/0232566 A1 | 8/2014 | Mimeault et al. |
| 2014/0248898 A1 | 9/2014 | O'Brien et al. |
| 2014/0253288 A1 | 9/2014 | O'Brien et al. |
| 2014/0308971 A1 | 10/2014 | O'Brien et al. |
| 2015/0050923 A1 | 2/2015 | Tu et al. |
| 2015/0071310 A1 | 3/2015 | Kim et al. |
| 2015/0080014 A1 | 3/2015 | Ben-Yosef et al. |
| 2015/0092685 A1 | 4/2015 | Lee et al. |
| 2015/0105944 A1 | 4/2015 | Louboutin |
| 2015/0116079 A1 | 4/2015 | Mishra et al. |
| 2015/0138036 A1 | 5/2015 | Harper |
| 2015/0147974 A1 | 5/2015 | Tucker et al. |
| 2015/0235486 A1 | 8/2015 | Ellis et al. |
| 2015/0287257 A1 | 10/2015 | Thompson |
| 2015/0291127 A1 | 10/2015 | Ghabra |
| 2015/0327022 A1 | 11/2015 | Lin et al. |
| 2015/0334534 A1 | 11/2015 | Babu et al. |
| 2015/0373482 A1 | 12/2015 | Barnard et al. |
| 2016/0019734 A1 | 1/2016 | Bauman et al. |
| 2016/0063786 A1 | 3/2016 | Lewis et al. |
| 2016/0088438 A1 | 3/2016 | O'Keeffe |
| 2016/0135013 A1 | 5/2016 | Bietz et al. |
| 2016/0272154 A1 | 9/2016 | Sanji et al. |
| 2016/0295435 A1 | 10/2016 | Baroudi et al. |
| 2016/0316343 A1 | 10/2016 | Kan et al. |
| 2016/0320469 A1 | 11/2016 | Laifenfeld et al. |
| 2017/0023659 A1 | 1/2017 | Bruemmer et al. |
| 2017/0106834 A1 | 4/2017 | Williams et al. |
| 2017/0232974 A1 | 8/2017 | Nishida |
| 2017/0236351 A1 | 8/2017 | Menard et al. |
| 2017/0303090 A1 | 10/2017 | Stitt et al. |
| 2017/0315215 A1 | 11/2017 | Berezin et al. |
| 2017/0342750 A1 | 11/2017 | Hiramine |
| 2018/0020333 A1 | 1/2018 | Gillen et al. |
| 2018/0029560 A1 | 2/2018 | Mohaupt et al. |
| 2018/0056936 A1 | 3/2018 | Parasurama et al. |
| 2018/0056989 A1 | 3/2018 | Donald et al. |
| 2018/0115065 A1 | 4/2018 | Valdes Garcia et al. |
| 2018/0123804 A1 | 5/2018 | Smith et al. |
| 2018/0126952 A1 | 5/2018 | Niemiec |
| 2018/0143298 A1 | 5/2018 | Newman |
| 2018/0148015 A1 | 5/2018 | Weghaus |
| 2018/0154865 A1 | 6/2018 | Bianchi, III et al. |
| 2018/0184268 A1 | 6/2018 | Stitt et al. |
| 2018/0186309 A1 | 7/2018 | Batten et al. |
| 2018/0213355 A1 | 7/2018 | Smith et al. |
| 2018/0350240 A1 | 12/2018 | Sivashankar et al. |
| 2019/0054842 A1 | 2/2019 | Raffa et al. |
| 2019/0130682 A1 | 5/2019 | Farges |
| 2019/0141478 A1 | 5/2019 | Vallampatti Ekambaram et al. |
| 2019/0208381 A1 | 7/2019 | Booij et al. |
| 2019/0253836 A1 | 8/2019 | Sinha et al. |
| 2019/0297454 A1 | 9/2019 | Smith et al. |
| 2020/0041878 A1 | 2/2020 | Lan et al. |
| 2020/0065722 A1 | 2/2020 | Smith |
| 2020/0092925 A1 | 3/2020 | Foster et al. |
| 2020/0196095 A1 | 6/2020 | Smith et al. |
| 2020/0196098 A1 | 6/2020 | Smith et al. |
| 2020/0228919 A1 | 7/2020 | Stitt et al. |
| 2020/0293830 A1 | 9/2020 | Liu et al. |
| 2020/0341137 A1 | 10/2020 | Mindell et al. |
| 2021/0383215 A1 | 12/2021 | Nakabayashi et al. |
| 2021/0392461 A1 | 12/2021 | Cooper et al. |

FOREIGN PATENT DOCUMENTS

| | | |
|---|---|---|
| JP | 2008-224445 | 9/2008 |
| JP | 2008-224489 | 9/2008 |
| JP | 2008-266955 | 11/2008 |
| JP | 2008-281522 | 11/2008 |
| JP | 2009-301546 | 12/2009 |
| JP | 2012-108141 | 6/2012 |
| JP | 2012-172334 | 9/2012 |
| JP | 2013-031045 | 2/2013 |
| JP | 2016-510401 | 4/2016 |
| JP | 2016-148590 | 8/2016 |
| JP | 2016-176907 | 10/2016 |
| JP | 2021-164535 | 10/2021 |
| WO | 2014/171082 | 10/2014 |
| WO | 2021/075210 | 4/2021 |

OTHER PUBLICATIONS

Faragher, R. et al., "An Analysis of the Accuracy of Bluetooth Low Energy for Indoor Positioning Applications", Proceedings of the 27th International Technical Meeting of the Satellite Division of the Institute of Navigation (ION GNSS+ 2014), Tampa, Florida, Sep. 2014, pp. 201-210.

Faragher, R., et al., "Location Fingerprinting With Bluetooth Low Energy Beacons", IEEE Journal on Selected Areas in Communications, vol. 33, No. Nov. 11, 2015, pp. 2418-2428.

Hereman, Willy et al., "Determination of a Position in Three Dimensions Using Trilateration and Approximate Distances", Department of Mathematical and Computer Sciences, Colorado School of Mines, Sep. 17, 1995, submitted to Decision Sciences, Oct. 1995, pp. 1-22.

Ryan, Mike, "Bluetooth: With Low Energy comes Low Security", iSEC Partners, presented at Proceedings of the 7th USENIX conference on Offensive Technologies, Aug. 13, 2013, pp. 1-7.

Halder, S.J. et al., "Advanced Smoothing Approach of RSSI and LQI for Indoor Localization System", International Journal of Distributed Sensor Networks, received Jul. 25, 2014; accepted Nov. 3, 2014, pp. 1-13.

Lindh, J., "Bluetooth Low Energy Beacons", Texas Instruments Corporation Application Report, Jan. 2015, pp. 1-13.

"Real-time locating system", available at https://en.wikipedia.org/wiki/Real-time_locating_system as of Feb. 6, 2014.

http://www.onyxbeacon.com/ available as of Jun. 25, 2014.

http://developer.estimote.com/ available as of Aug. 13, 2015.

(56) References Cited

OTHER PUBLICATIONS https://getpixie.com available as of Aug. 23, 2014.
http://www.slideshare.net/localzco/whats-bestmicrolocationtechnologyibeaconblenfcqrgps available as of Apr. 5, 2014.
International Search Report and the Written Opinion of the International Searching Authority for International Application No. PCT/US2017/027686 mailed Aug. 14, 2017.
Invitation to Pay Additional Fees for International Application PCT/US2017/027686 mailed Jun. 7, 2017.
International Search Report and the Written Opinion of the International Searching Authority for international application No. PCT/US2019/066254 mailed Apr. 7, 2020.

* cited by examiner

MACHINE LEARNING GENERATION FOR REAL-TIME LOCATION

FIELD OF THE INVENTION

The present application relates to a system and method for determining location information with respect to a portable device and an object, such as a vehicle.

BACKGROUND

Real-time location or position determinations for objects have become increasingly prevalent across a wide spectrum of applications. Real-time locating systems (RTLS) are used and relied on for tracking objects, such as portable devices, in many realms including, for example, automotive, storage, retail, security access for authentications, and security access for authorization. One area of commercial research and application has been in the so-called "digital key" industry, specifically in the collaboration between the automotive and mobile telecommunications industries to provide remote keyless entry. The goal of using a commercially available mobile phone as a proxy for a car key involves attempts to localize the mobile device with respect to the automobile.

One conventional RTLS in the automotive realm includes a transceiver or master controller located within a vehicle and capable of communicating via radio frequency (RF) with a portable device. One or more aspects of the communications between the master controller and the portable device, such as signal strength of the communications, angle of arrival, time of flight, and/or others, may be monitored and used as a basis for determining a location of the portable device relative to the vehicle.

Using a function based on the relationship between signal strength and distance, the location of the portable device relative to the vehicle can be computed. However, the accuracy of the function is likely to vary significantly from application to application and among different environments. A function may be considered accurate for one system under set conditions, and then provide a result that is significantly inaccurate under different conditions or with a slightly different system.

Digital key systems may include wireless radios using Bluetooth (BLE) and Ultra-wideband (UWB) technologies for cooperative source localization. Such systems using UWB for remote keyless entry to vehicles (via a smartphone and an on-vehicle suite of anchors) rely on real-time processing to convert the radio measurements (e.g., RSSI for BLE and range for UWB) into a localized position estimate (e.g., a set of Cartesian coordinates, a zone defined with respect to the vehicle, and a Boolean determination of inside versus outside the vehicle). Conventional systems often lack the computational resources necessary for determining a localized position estimate.

Efforts have been made to calibrate a localization function to determine the location of a portable device relative to a vehicle. For instance, in the context of the portable device being a phone and the object being a vehicle, the function may be calibrated such that it is considered accurate for one type of phone (e.g., an Apple iPhone) and vehicle (e.g., a Ford F-150). However, that same function may provide inconsistent or inaccurate results for another type of phone (e.g., a Samsung Galaxy) or vehicle (e.g., a Toyota Tacoma). Due to the large number of environmental factors and conditions, e.g., differing phone types and differing vehicle constructions, robustness for localization for different configurations is lacking in conventional systems.

SUMMARY

A system and method for determining location information of a portable device relative to an object is provided.

In general, one innovative aspect of the subject matter described herein is a system for determining location information pertaining to a location of a portable device relative to an object. The portable device may be a first device type, and the object may be a first object type. The first device type and the first object type may define an active configuration type. The system may include an object device disposed in a fixed position relative to the object, where the object device has an antenna configured to communicate wirelessly with the portable device via a communication link.

The system may include a controller configured to determine location information about the portable device relative to the object. The controller may include a locator configured to generate the location information based on a signal characteristic of communications received by the antenna from the portable device.

The locator may include a first machine learned portion, the first machine learned portion may be initially trained based on first truth information obtained with respect to a reference configuration type different from the active configuration type. The first machine learned portion may be subsequently trained based on second truth information obtained with respect to the active configuration type.

The foregoing and other embodiments can each optionally include one or more of the following features, alone or in combination. In particular, one embodiment includes all the following features in combination.

In some embodiments, the first machine learned portion may correspond to a first decision tree that is trained sequentially based on the first and second truth information. It is to be understood that the present disclosure is not limited to this configuration of the first machine learned portion, and that the first machine learned portion may be configured differently.

In some embodiments, a reference object type of object and a reference device type of portable device may define the reference configuration type.

In some embodiments, the second truth information provided as a basis for training the first machine learned portion may be based on communication between a test portable device and a test object. The test portable device may be classified according to the first device type such that the test portable device is the same type as the portable device, and the test object may be classified according to the first object type such the test object is the same type as the object.

In some embodiments, at least one of the reference object type and the reference device type that define the reference configuration type may be different respectively from the first object type and the first device type that define the active configuration type.

In some embodiments, an object configuration of the object varies over time such that the object may be a first object type at a first time and the object may be a second object type at a second time, where a third configuration type may be defined by the first device type and the second object type.

In some embodiments, a memory may be provided that stores a third machine learned portion, which may be trained based on third truth information obtained with respect to the third configuration type.

In some embodiments, the third machine learned portion may be based on a) the first machine learned portion that is initially trained based on the first truth information and b) the first machine learned portion being subsequently trained based on the third truth information obtained with respect to the third configuration type.

In some embodiments, the locator may be reconfigurable to include the first and third machine learned portions. The locator may be operable to determine the location information about the portable device relative to the object based on the first and third machine learned portions.

In some embodiments, a fourth configuration type may be provided that is defined by the first object type and an alternative portable device being a second device type different from the first device type. The system may include memory that stores a fourth machine learned portion that is trained based on fourth truth information obtained with respect to the fourth configuration type. The locator may be reconfigurable to include the fourth machine learned portion, and where the locator may be operable to determine the location information about the portable device relative to the object based on the fourth machine learned portion.

In some embodiments, the locator may include a second machine learned portion. The second machine learned portion may be initially trained based on first truth information obtained with respect to the reference configuration type different from the active configuration type. The locator may be operable to determine the location information based on the first machine learned portion and the second machine learned portion.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 2 depicts a system in accordance with one embodiment.

DETAILED DESCRIPTION

Figure 1:
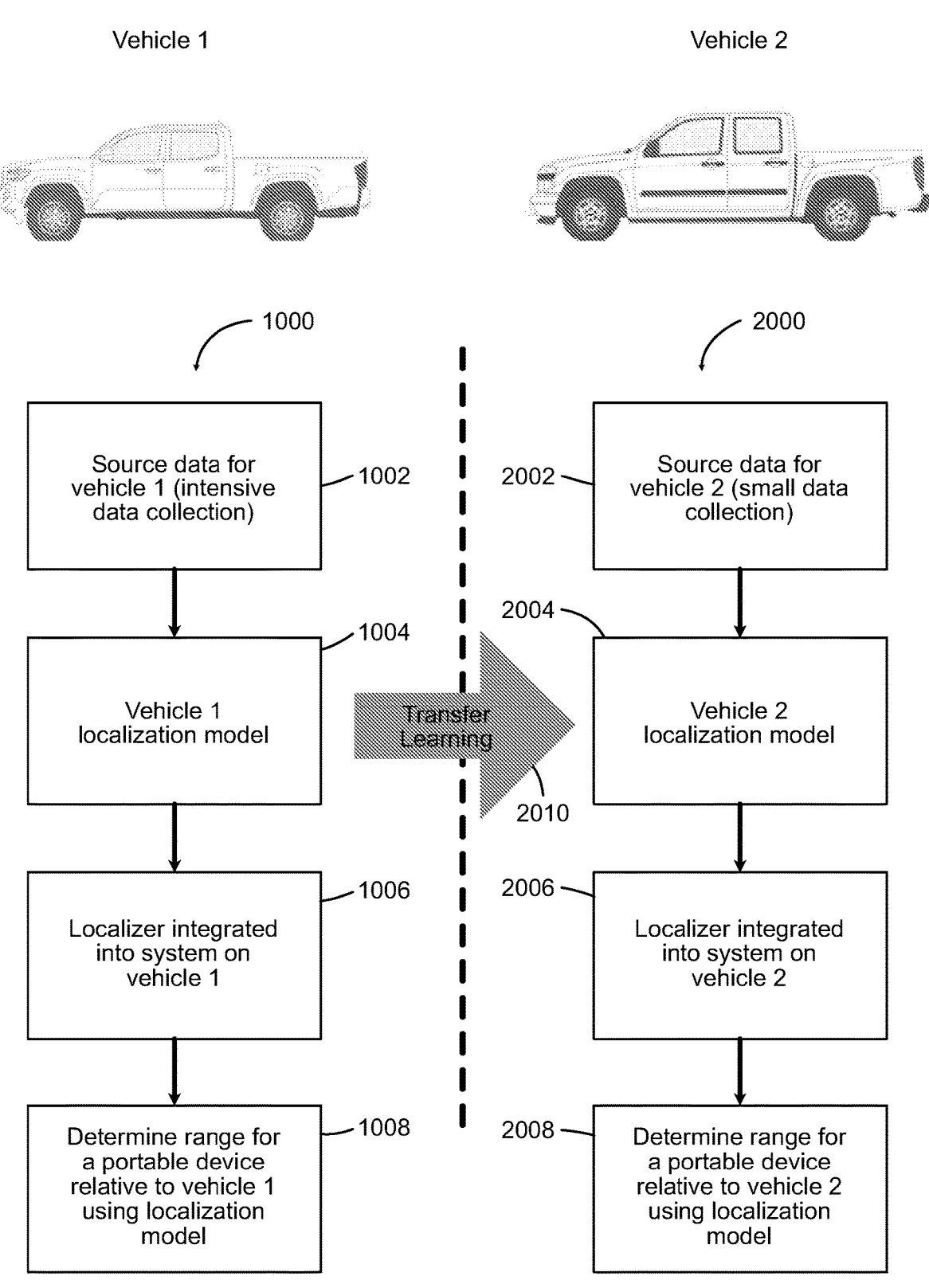
FIG. 1 shows first and second methods in accordance with one embodiment.

A system and method for determining location information of a portable device relative to an object and controlling operation of an object based on the location information is provided.

In one aspect, a localization system may be provided for passive access to a vehicle where the localization system is configured to use a machine learning model for determining the position of a mobile device with respect to the vehicle and the machine learning model is initialized via the use of transfer learning based on the platform of the vehicle. That is, for a particular model of vehicle, a machine learning model is constructed by combining a machine learning model for a vehicle platform (e.g., SUV, pickup truck, sedan, etc.) with a machine learning model for a specific model (e.g., Toyota Camry, Ford Explorer, etc.). Alternatively, or additionally, there may be more than one transfers in such a transfer learning chain. For instance, first, second, and third models may be provided. One or more aspects of the first model may be transferred to the second model, which may be subsequently trained after the transfer. One or more aspects of the second model, after training thereof, may be transferred to the third model, which may be subsequently trained. The first model may be considered a generic model that may be applicable to a vehicle of any type. The transfer progression may proceed from such a generic model to a less generic model for a vehicle (e.g., a vehicle make model or vehicle type model [e.g., SUV or sedan]), and then from the less generic model to a more specific model (e.g., a specific vehicle model, including make and model).

In another aspect, the localization system is applied in a non-automotive context for passive access where the localization system is configured for passive access to a structure. The localization system may be configured to use a machine learning model for determining the position of a mobile device with respect to the structure, where the machine learning model is initialized via the use of transfer learning based on a particular instance of the structure. For a particular type of structure, a machine learning model may be constructed by combining a machine learning model for accessing a type of structure (e.g., hotel room, gym, pool, condominium, apartment, house, retail space, etc.) with a machine learning model for a specific instantiation of the structure (e.g., a particular hotel at a specific location, a specific residence, etc.).

Any number of machine learning localization models can be used for determining where the mobile device (smart phone, key fob, etc.) is in relation to the object. Any machine learning technique that includes multiple levels of representation can be used for transfer learning where some of the levels of representation from a previous model are applied to a new model. Classes of machine learning algorithms that include multiple levels of representation include multilayer perceptron networks, convolutional neural networks, long short-term memory recurrent neural networks, gradient boosted decision trees and random forests. Specific implementations that can be implemented on embedded systems include xgboost and TensorFlow Lite though any of the machine and deep learning techniques that fall under the umbrella term TinyML are contemplated. In general, these algorithms take, as input, data indicative of a characteristic of a component of the system (e.g., the vehicle or the mobile device) and/or communications with a component of the system. For instance, the data may be reflective of how far the mobile device is from each of the remote devices. As another example, the data may be reflective of distance and/or angle, signal strength, link quality, and a vehicle state, or any combination thereof. Data may be based on one or more types of communications, including, for instance, BLE/HADM CS, and data provided as an input may include BLE ToF, BLE Phase/Phase-based distance, BLE Round-Trip-Time, BLE Angle, BLE RSSI, or a distance computed from any combination of these, or any combination thereof. Additionally, or alternatively, derived inputs, such as link quality, link presence/absence, channel impulse response, may be provided as input. Further, additionally, or alternatively, data from the vehicle, such as door open, closed, window open, closed, engine running/off, trunk open/closed, other vehicle state, may be provided as input or used as a basis for deriving such an input.

The learning algorithm may convert information or input into a model that can predict where the mobile device is with respect to the object.

In one embodiment, because the model is constructed with multiple levels of representation, some of the levels of a first machine learning model constructed with data collected pertaining to a first model of vehicle to initiate a second machine learning model are applied to a second model of vehicle where the two vehicles are of the same platform (e.g., parts of a model constructed with data from a Ford Explorer are used to build a machine learning model for a GMC Yukon). The second model may then be improved by additional data collection with a localization system installed on the second model of vehicle.

In one embodiment, data may be collected on and around a vehicle in a series of environments and conditions to create a machine learning model in a time intensive manner. This effort may be repurposed for new machine learning models where less data is collected or fewer environments are tested, or both, thereby lessening the burden of data collection for building localization systems for new vehicles.

In one embodiment, the process between types of localization algorithms may be split up, where one or more of the algorithms would be agnostic to vehicle platform and model. For instance, a remote device may only perform multilateration calculations and determine a Cartesian coordinate estimate of a mobile device. A second remote device may perform a heuristics fingerprinting operation on UWB ranging data, and a third remote device may execute a machine learning-based model built for the vehicle. Then, the three results can be combined to generate a final localization estimate that includes both a zone determination and a position estimate from both UWB and BLE data. In this way, the multilateration algorithm would not include any information related to the vehicle platform, the heuristics algorithm would be generally applicable to the vehicle platform or vehicle model depending upon the implementation, and the ML model would be entirely built based on data related to the specific vehicle model. Further examples of division of localization efforts are described in U.S. Appl. No. 63/240,392, entitled DISTRIBUTED GENERATION OF REAL-TIME LOCATION, filed Sep. 3, 2021 to Cooper et al.—the disclosure of which is hereby incorporated by reference in its entirety.

In another example, two remote devices can be configured each with a separate machine learning model loaded in flash memory. A first machine learning model may be built with only platform dependent data—e.g., a model built with lower levels of representation. A second machine learning model may be built with vehicle model data. During a localization operation, each machine learning model may make a localization determination, and a weighted voting procedure may then combine the two outputs to determine a final localization output. One or more of these machine learning models may be based on transfer learning aspects described herein, including transference of aspects from one or more models. For instance, if models B and C are disposed in separate remote device, aspects of model A may be transferred in to models B and C in the process of training these models. As another example, a model A* may be disposed in one remote device and trained based on transference of aspects from model A, and model C* may be disposed in another remote device and trained based on transference of aspects from model C, which itself may be based on transference of aspects from model A.

The system may include a plurality of remote devices disposed on the object and capable of obtaining sensor information with respect to communications with the portable device. The communications may be between the portable device and a device other than the remote devices or the communications may be between the portable device and one or more of the remote devices, or a combination thereof. One or more aspects of the sensor information may be obtained directly by a remote device or may be communicated to the remote device, or a combination thereof.

In one embodiment, a locator system may be provided within the overall system that is capable of determining a location of the portable device relative to the object. Aspects of the locator system may be distributed among the plurality of remote devices, such that a determination of the location of the portable device may be achieved in a distributed manner. An example of such a locator system is described in U.S. Appl. No. 63/240,392, entitled DISTRIBUTED GENERATION OF REAL-TIME LOCATION, filed Sep. 3, 2021, to Cooper et al.—the disclosure of which is hereby incorporated by reference in its entirety.

In one aspect, a locater system may be provided for passive access that includes multiple remote devices where the determination of a mobile device with respect to an object (e.g., an automobile, a building etc.) is determined based on communications received by the remote devices and transmitted from the mobile device. The remote devices can include UWB radios, BLE radio, NFC readers, or any type of RF antenna for interfacing with a mobile device.

Any number of localization algorithms can be used for determining where the mobile device (smart phone, key fob, etc.) is in relation to the object. Classes of algorithms include but are not limited to multilateration, fingerprinting/heuristics, machine learning, or another algorithm or function described herein, or any combination thereof. The algorithms may take, as input, data indicative of a characteristic of a component of the system (e.g., the vehicle or the mobile device) and/or communications with a component of the system. For instance, the data may be reflective of how far the mobile device is from each of the remote devices. This input or information may be translated into an estimate of where the mobile device is with respect to the object.

With respect to machine learning based localization, the process of training the algorithm can involve truth data obtained with respect to a reference configuration type that includes a first device type of a portable device and a first object type of an object. For instance, the first device type may correspond to a specific model of Apple iPhone, and the first object type may correspond to a specific make and model of vehicle (e.g., a Ford F-150 XL). The first object type may also correspond to a state of the object—for instance, in the context of the first object type including a specific make and model of vehicle, the first object type may also correspond to a state of the vehicle having its doors and windows closed.

In one embodiment, the state of the object may be based on an environment type of the object, such as the surrounding environment (e.g., inside, outside, highly reflective, parking garage, or nearby vehicles, or a combination thereof). Accordingly, a first object type and a second object type may be different based on differences in the surrounding environment for the first object type relative to the second object type.

In one embodiment. the state of the object may be based on pose information about the portable device (e.g., moving, not moving, on call, in pocket, or height from the ground, or a combination thereof).

Truth information obtained with respect to the reference configuration may be used as a basis for training a first machine learned model. The machine learned model may also be described as a machine learning model, where the machine learning model has been trained with the truth information to generate location information. The input to the machine learned model may be of a type similar to the input provided in the truth information, including for instance, one or more of signal strength, time of flight, and angle of arrival, or input described herein or any input based on such inputs, or any combination thereof. The machine learned model may be trained to generate an output (e.g., location information) similar to the output provided in the truth information. Example outputs include one or more zones and/or coordinate positions. The one or more output may each be associated with a confidence indicator.

The machine learned model may be configured according to a plurality of parameters (e.g., hyperparameters) that define aspects of the model, including, for instance, an architecture of the model and one or more training parameters that direct the manner in which the model is trained. An untrained version of the model may be initialized according to one or more weights associated with nodes of the model. These one or more weights may be random prior to training. The number of nodes and the node structure of the model may vary during training.

In one embodiment, a machine learning model may be provided that utilizes a decision tree structure, such as the one defined by the XGBoost system. An output from one decision tree (e.g., a residual) may be supplied to another decision tree structure, potentially generating a chain of decision trees. The outputs from the decision trees may also be processed according to a function (e.g., a summation) to yield an output of the machine learning model. During training, this output may be compared against a true output included with the truth information using an error function. Aspects of the machine learning model may be varied based on an error metric of this error function, including node weights of one or more decision trees, the number of nodes in one or more decision trees, and the number of decision trees. As an example, the error function may be utilized in conjunction with a gradient descent algorithm to iteratively vary aspects of the machine learning model to affect the error metric of the effort function toward a target error metric. For instance, the machine learning model may be varied iteratively in an effort to reduce, potentially minimize, the error metric. As another example, the machine learning model may be varied iteratively in an effort to optimize the error metric. In yet another example, the machine learning model may be varied to reduce the error metric, but within the constraints of other system requirements, such as a machine learning algorithm execution time or model size (e.g., for storage constraints).

It is to be understood that the type of machine learning model may vary from application to application and is not limited to a decision tree-based model. For instance, a neural network or multiple layers thereof may be incorporated into a machine learning model in accordance with one embodiment of the present disclosure. Example neural networks include a recurrent neural network (RNN), including a long short term memory (LSTM) type of RNN configured and trained to generate location information. The node weights of the neural network or networks can be varied during training based on an error metric of an error function, similar to the training process described in conjunction with the decision tree-based model.

A machine learning model that has been trained in accordance with one embodiment of the present disclosure may be considered a machine learned model capable of generating location information based on one or more inputs. The machine learned model, as described herein, may be trained based on truth data obtained with respect to a reference configuration that includes a first device type and a first object type. The machine learned model may be configured to generate location information with a level of confidence; however, for a configuration different from the reference configuration, the machine learned model may not be configured to generate location information with this level of confidence. For instance, if the first device type is changed to a second device type, the location information output from the machine learned model may be less accurate than would otherwise be output for the first device type.

In one embodiment, the machine learned model may be identified as a first machine learned model that has been trained for the reference configuration. This first machine learned model may form the basis for training a second machine learned model for a second configuration different from the reference configuration. For instance, the first machine learned model, or an aspect thereof, may form the initial state of the second machine learned model prior to being trained in accordance with truth data for the second configuration.

Use of a first machine learned model, or an aspect thereof, as a basis for training a second machine learned model for a different configuration may be described as transfer learning. Such transfer learning may enhance training efficiency for different configurations. For instance, the amount of truth data used to train a second machine learned model for a second configuration may be less than the amount of truth data used to train the first machine learned model, which is used as a basis for training the second machine learned model. It is noted that the second (more specific) model may have additional parameters relative to the first model. For instance, the amount of truth data, number of inputs, or number of hyperparameters, or any combination thereof, that is used to train the second model may be more than the first model.

In one embodiment, parameters that define the first machine learned model or the process for training the first machine learned model, or both, may be provided as a basis for training the second machine learned model. This type of transfer learning may decrease the amount of time invested to train the second machine learned model to yield results that comply with a target degree of confidence. As an example, the hyperparameters of a first machine learned model for one make of vehicle may be extracted for use in training a second machine learned model for another vehicle. In this case, the data for the first machine learned model is not shared or used as a base learner; however, the hyperparameters used for optimizing performance of the first machine learned model are used for training the second machine learned model for a completely different vehicle. This type of transfer learning may provide a significant time savings because identifying hyperparameters, potentially optimal hyperparameters, for a model that can actually fit onto a microprocessor is time intensive.

In one embodiment, a first model may be static, and a second model may include one or more aspects transferred from the first model. The second model may include a dynamic ML or AI process that learns dynamically. The first model in this example may be based on one or more aspects transferred from another model. For instance, if the other model is a first model and the first model is a second model, then the first model may be transferred to train the second model, which can then be extended by a dynamic learning system that learns in real-time based on system events (e.g., door handle was touched, so the device is determined to have been in a particular zone).

I. System Overview

Figure 2:
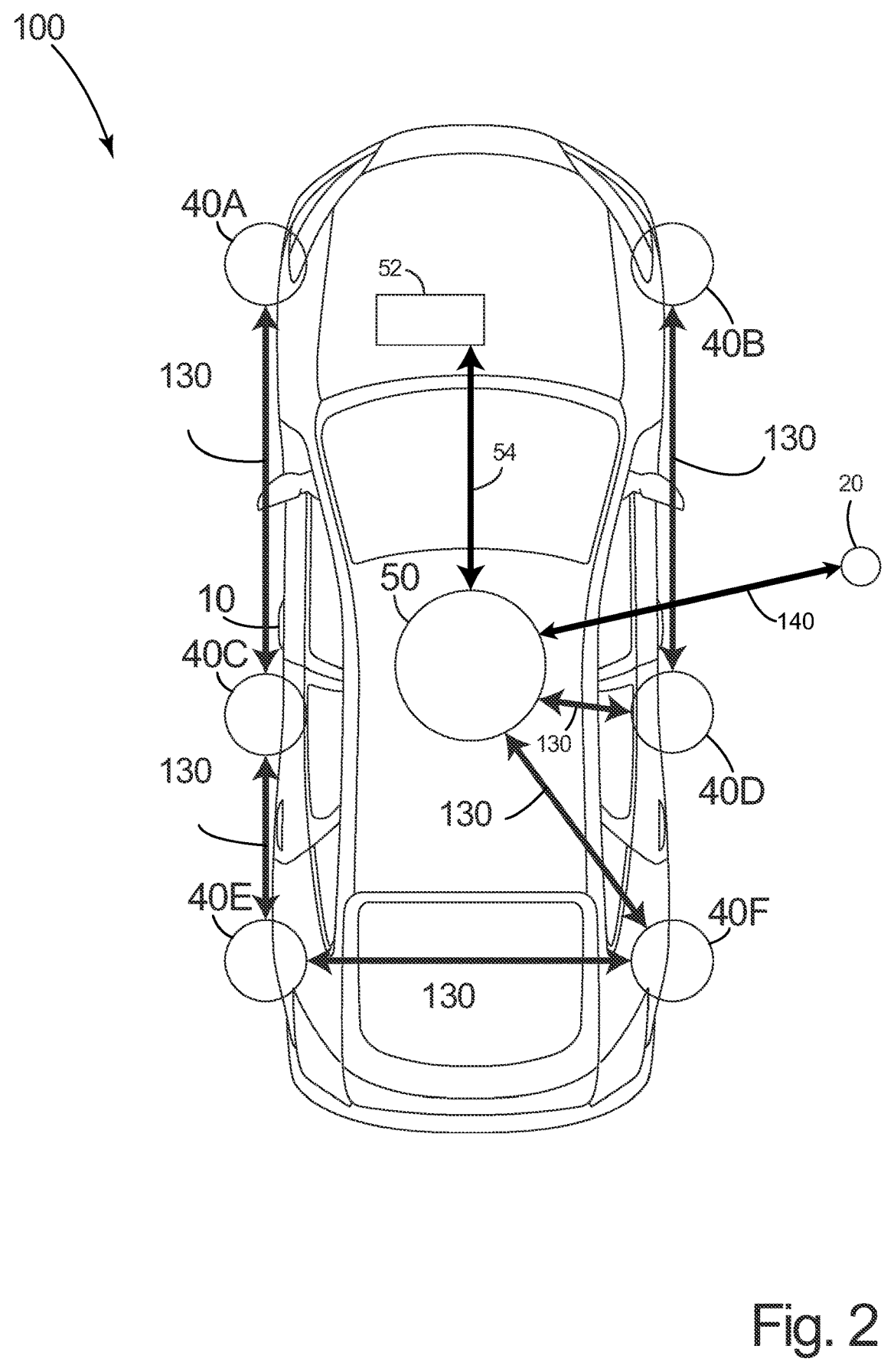
Figure 3:
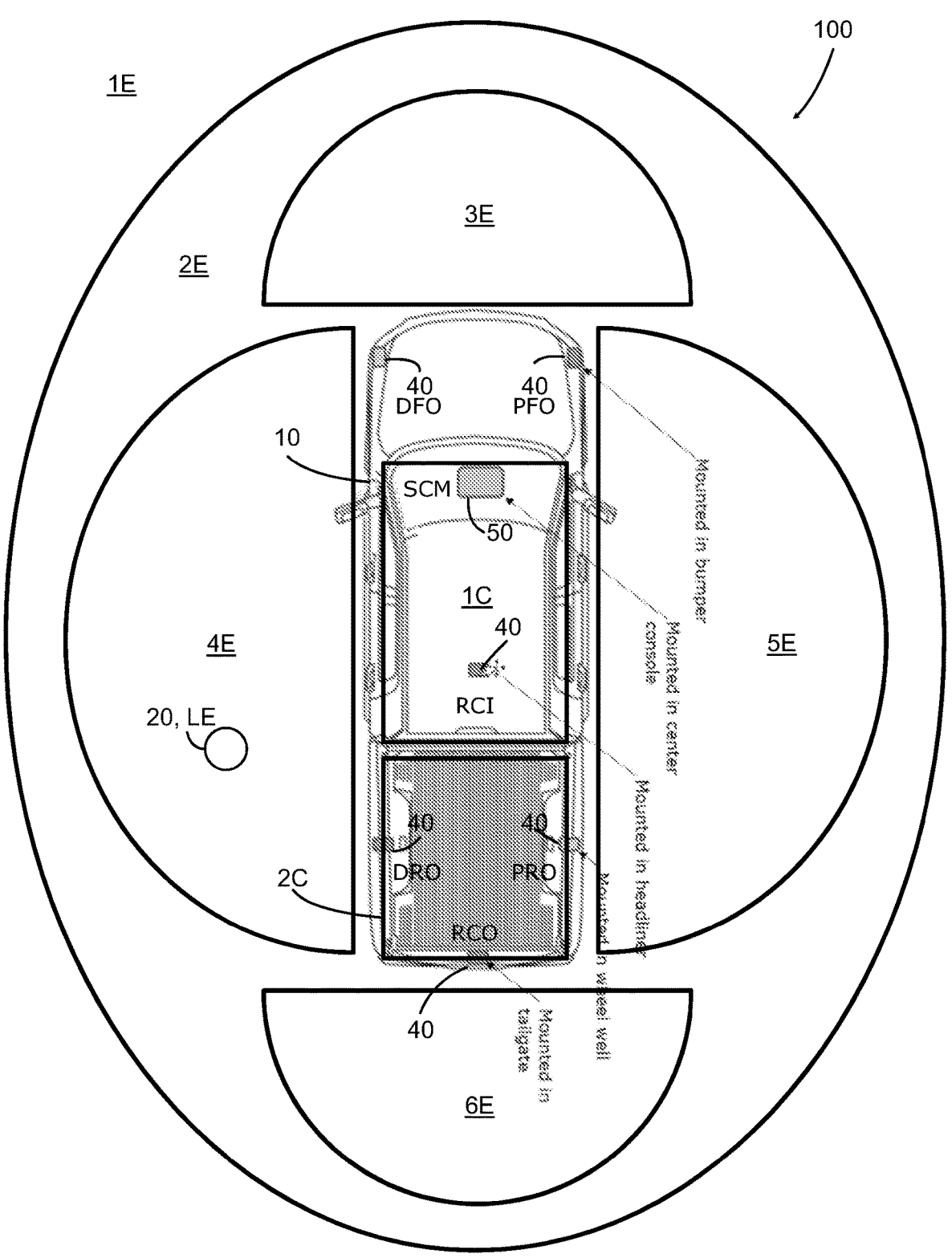
FIG. 3 shows a system in accordance with one embodiment.
Figure 4:
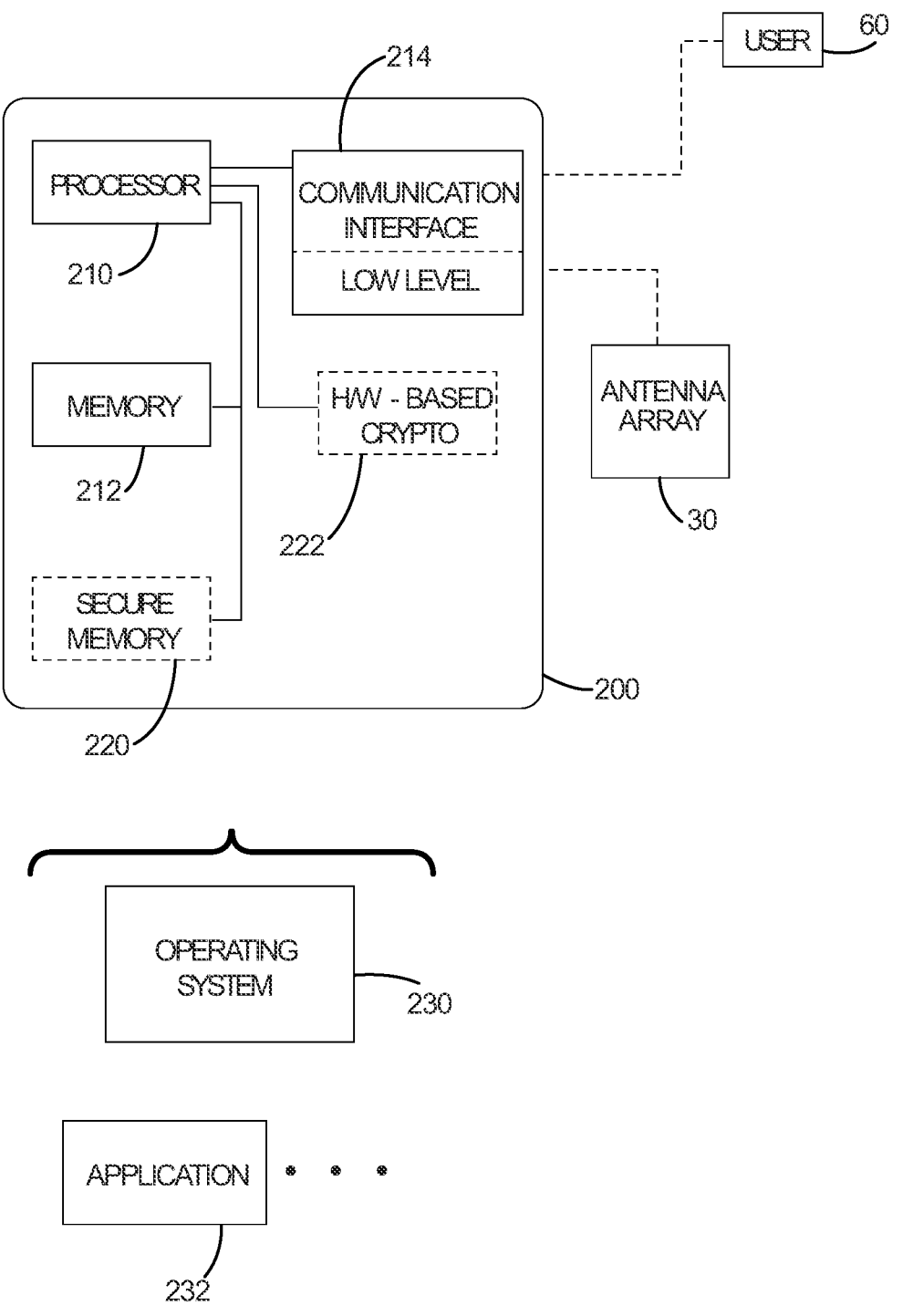
FIG. 4 shows a representative view of a device of a system in accordance with one embodiment.

A system in accordance with one embodiment is shown in the illustrated embodiment of FIGS. 2-4 and generally designated 100. The system 100 may include one or more system components as outlined herein. A system component may be a user 60 or an electronic system component, which may be the portable device 20, a sensor (e.g., a remote device 40), or an object device 50, or a component including one or more aspects of these devices. The underlying components of the object device 50, as discussed herein, may be configured to operate in conjunction with any one or more of these devices. In this sense, in one embodiment, there may be several aspects or features common among the portable device 20, the sensor, and the object device 50. The controller 200 in the illustrated embodiment of FIG. 4 and described in connection with the object device 50 may be incorporated into the portable device 20, or the sensor, or both. In one embodiment, the object device 50 may form an equipment component disposed on an object 10, such as a vehicle, a building, access control system, lock, building, train car, bus, automated teller machine, point of sale terminal, or speaker. In other words, the object 10 is not limited to the vehicle depicted in the illustrated embodiments and may be any type of object or equipment for which localization may be utilized.

The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller 52 configured to control operation of the object 10. The object 10 may include one or more communication networks, wired or wireless, that facilitate communication between the object controller 52 and the object device 50. The communication network for facilitating communications between the object device 50 and the object controller 52 is designated 54 in the illustrated embodiment of FIG. 2 and provided as a CAN bus. Other operational examples are UART, SPI, Ethernet, LIN, in addition to or alternative to CAN, or any other wired or wireless (e.g., BLE) bus.

In one embodiment, the system may include a communication controller, such as a telematics control unit (not shown). For instance, the TCU (telematics control unit) may be connected to the object device 50 (via SPI or any other type of communication protocol described herein). In another embodiment, the TCU may be combined with the object device 50. In another embodiment, the TCU may be part of the vehicle's object control 52, or connected to the vehicle's object control 52. In another embodiment, the TCU may be absent and data could be tunneled through the portable device (e.g., via BLE). "Tunneled" may be defined as a traditional tunnel—like running TCP/IP over BLE; however, the present disclosure is not so limited. The tunnel may be defined as a configuration that enables relevant data to be communicated to the object device 50 or other system components via commands/responses. The communication controller may be any type of control unit or system capable of facilitating communications. A communication controller may be provided in any component described herein, including the object or the portable device, or both.

In one embodiment, the TCU may include a cellular modem or other long range WAN radio (Lora, Sigfox, etc.).

In one embodiment, as described above, the TCU is not a required part of the system; for instance, all functionality of the TCU and the system it communicates with may be performed locally (not in the cloud).

II. Object Device

In the illustrated embodiment of FIG. 4, the control system or controller 200 is shown in further detail. The controller 200 may be provided in the object device 50 and may be configured to control operation of the object device 50 in accordance with the one or more functions and algorithms discussed herein, or aspects thereof. The system components, such as the portable device 20, or the remote device 40 (e.g., a sensor), or both, may similarly include a controller 200 configured to control operation or aspects of the respective system component.

The controller 200 includes any and all electrical circuitry and components to carry out the functions and algorithms described herein. Generally speaking, the controller 200 may include one or more microcontrollers, microprocessors, and/or other programmable electronics that are programmed to carry out the functions described herein. The controller 200 may additionally or alternatively include other electronic components that are programmed to carry out the functions described herein, or that support the microcontrollers, microprocessors, and/or other electronics. The other electronic components include, but are not limited to, one or more field programmable gate arrays, systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to: CAN, LIN, FireWire, I2C, RS-232, RS-422, RS-485, SPI, Ethernet, Universal Serial Bus (USB), and RF (cellular, WiFi, Bluetooth, Bluetooth Low Energy). As described herein, the terms locator, module, model, and generator designate parts of the controller 200. For instance, a model or locator in one embodiment is described as having one or more core functions and one or more parameters that affect output of the one or more core functions. Aspects of the model, locator, module, or generator, or a combination thereof, may be stored in memory of the controller 200, and may also form part of the controller configuration such that the model, locator, module, or generator, or combination thereof is part of the controller 200 that is configured to operate to receive and translate one or more inputs and to output one or more outputs. A model, locator, module, or generator, or a combination thereof, may be parts of the controller 200 such that the controller 200 is configured to receive an input described in conjunction with the model, locator, module, or generator, or a combination thereof, and provide an output corresponding to an algorithm associated with the model, locator, module, or generator, or a combination thereof.

The controller 200 of the object device 50 in the illustrated embodiment of FIG. 4 may include one or more processors 210 that execute one or more applications 232 (software and/or includes firmware), one or more memory units 212 (e.g., RAM and/or ROM), and one or more communication interfaces 214, amongst other electronic hardware. The object device 50 may or may not have an operating system 230 that controls access to lower-level devices/electronics via a communication interface 214. The object device 50 may or may not have hardware-based cryptography units 222—in their absence, cryptographic functions may be performed in software. The object device 50 may or may not have (or have access to) secure memory units 220 (e.g., a secure element or a hardware security module (HSM)). Optional components and communication paths are shown in phantom lines in the illustrated embodiment.

The controller 200 in the illustrated embodiment of FIG. 4 is not dependent upon the presence of a secure memory unit 220 in any component. In the optional absence of a secure memory unit 220, data that may otherwise be stored in the secure memory unit 220 (e.g., private and/or secret keys) may be encrypted at rest (when possible). Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 214 may be any type of communication link, including any of the types of communication links described herein, including wired or wireless. The communication interface 214 may facilitate external or internal, or both, communications. For instance, the communication interface 214 may be coupled to or incorporate an antenna array 30. The antenna array 30 may include one or more antennas configured to facilitate wireless communications, including BLE communications, Ultrawide Band (UWB) communications, or another type of wireless communications, or a combination thereof.

As another example, the communication interface 214 may provide a wireless communication link with another system component in the form of the portable device 20, such as wireless communications according to the WiFi standard. In another example, the communication interface 214 may be configured to communicate with an object controller 52 of a vehicle (e.g., a vehicle component) via a wired link such as a CAN-based wired network that facilitates communication between a plurality of devices. The communication interface 214 in one embodiment may include a display and/or input interface for communicating information to and/or receiving information from the user 60.

In one embodiment, the object device 50 may be configured to communicate with one or more auxiliary devices other than another object device 50 or a user. The auxiliary device may be configured differently from the object device 50—e.g., the auxiliary device may not include a processor 210, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

The system 100 in the illustrated embodiment may be configured to determine location information in real-time with respect to the portable device 20. In the illustrated embodiment of FIG. 2, the user 60 may carry the portable device 20 (e.g., a smartphone). The system 100 may facilitate locating the portable device 20 with respect to the object 10 (e.g., a vehicle) in real-time with sufficient precision to determine whether the user 60 is located at a position at which access to the object 10 or permission for an object 10 command should be granted.

As an example, in the illustrated embodiment of FIG. 3, one or more zones may be defined with respect to the object 10. Additionally, it is noted that the types of remote devices (e.g., sensors 40) disposed in the object 10 may vary. For instance, multiple types of remote devices 40 may be provided, including remote devices 40 configured as one or more of the following: driver front outside (DFO), passenger front outside (PFO), rear center inside (RCI), rear center outside (RCO), or a combination thereof. Such remote devices 40 may be disposed at various positions on the object 10.

The one or more zones may be exterior or interior with respect to the object 10. For instance, in the context of the object 10 being a vehicle, several exterior zones 1E, 2E, 3E, 4E, 5E, 6E may be defined with respect to areas of the vehicle, with zone 1E corresponding to a remote zone, zone 2E corresponding to the largest zone of detection (e.g., considered a welcome or approach region [e.g., 8 m]), zone 4E corresponding to a drive-side zone, zone 5E corresponding to a passenger side zone, zone 3E corresponding to a front vehicle zone, and zone 6E corresponding to a rear vehicle zone (e.g., proximal to a trunk, hatch, or lift gate of the vehicle). Interior zones or zones within a vehicle cabin, a vehicle storage area, or a vehicle compartment may also be defined with respect to the vehicle. It is noted that, similar to the exterior zones, interior zones may not be mutually exclusive such that one zone is defined within another zone. In the illustrated embodiment, interior zone 1C may define a cabin interior zone. As another example, zone 2C may correspond to a bed of the vehicle. In the illustrated embodiment of FIG. 3, as described herein, a system may identify or determine a localization estimate or position LE of a portable device 20 based on wireless communications with the portable device 20. The position LE determined based on wireless communications may be based at least in part on a determination of the portable device 20 being within the one or more zones defined with respect to the vehicle 10.

In one embodiment, where the object 10 is a vehicle, the system 100 may facilitate determining whether the portable device 20 is outside the vehicle but in close proximity, such as within 5 feet, 3 feet, or 2 feet or less, to the driver-side door. This determination may form the basis for identifying whether the system 100 should unlock a portion of the vehicle, such as the driver-side door. On the other hand, if the system 100 determines the portable device 20 is outside the vehicle and not in close proximity to the driver-side door (e.g., outside the range of 2 feet, 3 feet, or 5 feet), the system 100 may determine to lock the driver-side door. As another example, if the system 100 determines the portable device 20 is in close proximity to the driver-side seat but not in proximity to the passenger seat or the rear seat, the system 100 may determine to enable mobilization of the vehicle. Conversely, if the portable device 20 is determined to be outside close proximity to the driver-side seat, the system 100 may determine to immobilize or maintain immobilization of the vehicle.

The system 100 may determine to unlock or lock any portion of the vehicle based on a zone determination with respect to the portable device 20. For instance, for zone 5E, the system 100 may determine to lock or unlock the passenger door. The tailgate or trunk may be unlocked or locked based on a zone determination with respect to zone 6E, and the hood may be unlocked or locked based on a zone determination with respect to zone 3E. As described herein, the system 100 is not limited to a vehicle. For instance, the system 100 may be configured to unlock/lock allow access/restrict access to a particular capability (e.g., an option in the UI of a screen, ability to pay for a service or item, allow a user to interact with a particular device, etc.) or allow a user operation to complete (e.g., Point of Sale).

The object 10 may include multiple object devices 50 or variants thereof, such as a remote device 40 coupled to an antenna array 30 in accordance with one or more embodiments described herein.

Microlocation of the portable device 20 may be determined in a variety of ways, such as using information obtained from a global positioning system, one or more signal characteristics of communications from the portable device 20, and one or more sensors (e.g., a proximity sensor, a limit switch, or a visual sensor), or a combination thereof. An example of microlocation techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

In one embodiment, in the illustrated embodiment of FIG. 2, the object device 50 (e.g., a system control module (SCM)) and a plurality of remote devices 40 (coupled to an antenna array 30) may be disposed on or in a fixed position relative to the object 10. Example use cases of the object 10 include the vehicle identified in the prior example, or a building for which access is controlled by the object device 50.

The portable device 20 may communicate wirelessly with the object device 50 via a communication link 140. The plurality of remote devices 40 may be configured to sniff the communications between the portable device 20 and the object device 50 to determine one or more signal characteristics of the communications, such as signal strength, angle of arrival, time of flight, or any combination thereof. In an alternative embodiment, the portable device 20 may establish communications with another device other than the object device 50, but at least one of the object device 50 and the one or more remote devices 40 may be configured to sniff these communications to determine a location of the respective device relative to the object 10.

The communication link 140 in the illustrated embodiment is a Bluetooth Low Energy (BTLE) communication link. However, the present disclosure is not so limited. For example, the communication link 140 may not be BTLE; it may be wired or wireless and established according to any protocol, including UWB instead of BTLE. As another example, the communication link 140 may include more than one type of communication link; e.g., the communication link 140 may be established according to both BTLE and UWB. As another example, the communication link 140 may be established according to one protocol (e.g., BTLE) between the portable device 20 and the object device 50, and a second communication link may be established between the portable device 20 and another device on the object 10, such as a remote device 40 (e.g., a sensor), according to a protocol that is the same or different from the protocol of the communication link 140. The communications of one or both of these communication links may be sniffed.

The signal characteristics determined with respect to communication links with the portable device 20 may be communicated or analyzed and then communicated to the object device 50 via a communication link 130 separate from the communication link between the portable device 20 and the object device 50. Additionally, or alternatively, the portable device 20 may establish a direct communication link with one or more of the remote devices 40, and the one or more signal characteristics may be determined based on this direct communication link.

As described herein, one or more signal characteristics, such as signal strength, time of flight, angle of arrival, any other characteristic or input described herein, a signal characteristic or input based on another characteristic or input (e.g., an output provided by another model that generates the output based on the other characteristic or input), or any combination thereof, may be analyzed to determine location information about the portable device 20 relative to the object 10, an aspect of the object 10, or the object device 50, or a combination thereof. For instance, time difference of arrival or the angle of arrival, or both, among the remote devices 40 and the object device 50 may be processed to determine a relative position of the portable device 20. The positions of the one or more antenna arrays 30 relative to the object device 50 may be known so that the relative position of the portable device 20 can be translated to an absolute position with respect to the antenna arrays 30 and the object device 50.

Additional or alternative examples of signal characteristics may be obtained to facilitate determining position according to one or more algorithms, including a distance function, trilateration function, a triangulation function, a multilateration function, a fingerprinting function (e.g., a fingerprinting heuristics), a security and consistency checking function, a differential function, a time of flight function, a time of arrival function, a time difference of arrival function, an angle of departure function, a geometric function, a machine learning function, etc., or any combination thereof. As described herein, output from multiple algorithms may be combined or correlated in a variety of ways to determine a position LE. Additionally, or alternatively, a position LE determined from one or more algorithms may be enhanced by one or more other algorithms (e.g., by increasing accuracy, precision, or confidence, or a combination thereof).

III. Locator

The system 100 in the illustrated embodiment of FIGS. 2-4 may be configured to determine location information about the portable device 20 relative to the object 10. The location information may be indicative of an exterior location of the portable device 20 relative to the object 10, or the location information may be indicative of an interior location of the portable device 20 within the object 10, or a combination thereof. In one embodiment, a locator may be configured to determine this location information.

As discussed herein, a locator may receive one or more inputs that may vary from application to application. Examples of inputs include one or more signal characteristics of the communications, such as signal strength (RSSI), angle of arrival (AOA), time of flight (TOF), time of arrival, a phase characteristic, a phase based ranging procedure of BLE channel sounding (CS), a velocity estimate of a phase based ranging procedure of BLE CS, and a range estimate of a round trip time (RTT) procedure of BLE CS. The one or more signal characteristics may be analyzed to determine location information about the portable device 20 relative to the object 10, an aspect of the object 10, or the object device 50, or a combination thereof.

For instance, a phase rotation of a tone transmission, and optional re-transmission, or a phase characteristic indicative of a phase rotation may form the basis for determining a distance between an object device 50 or a remote device 40 and the portable device 20. The tone transmission may form part of a tone exchange in which a plurality of transmissions are conducted according to multiple frequencies. A phase rotation with respect to such transmissions may form the basis for a distance determination with respect to the object device 50 and the portable device 20. The tone exchange may be described as a channel sounding approach (e.g., BLE channel sounding (CS)) for determining a range or distance between devices (e.g., between the object device 50 and the portable device 20).

With respect to an electromagnetic wave traveling at the speed of light in a particular medium (e.g., air), an amount of phase rotation may be translatable to a distance or a time. In one embodiment, an RTT may be determined with respect to transmissions to and from a device, such as the portable device 20, via measurement of a phase characteristic or a time characteristic. In other words, two-way transmissions to and from the portable device 20 may be analyzed to determine a roundtrip time, which can be translated as a time of flight.

Because the wavelength for high frequency transmissions can be short relative to the target distance being measured, the transmissions wrap or complete full phase rotations such that total phase rotation embodied as the total distance cannot be measured directly from a phase in the input stage of the RF circuitry (e.g., by the mixer stage). For instance, for a carrier frequency at 2.4 GHz, the phase rotation wraps around $2\pi$ with d in the range of 12 cm. A phase measurement may indicate a phase within the range $0$-$2\pi$, but the phase measurement does not directly indicate the number of phase rotation wraps.

To measure longer distances without ambiguity, two different frequencies (f0, f1) can be used at two different instants i in time (i0, i1) to compute two different phases rotations. The two different phase rotations can be used to measure the distance. A phase-based distance determination is described in conjunction with two different frequencies— however, it is to be understood that phase measurements for a plurality of frequencies (including more than two frequencies) may be used to enhance accuracy of the distance determination. The use of multiple frequencies in the phase analysis may be considered a type of channel sounding approach to determine distance between devices. The locator in one embodiment may translate the signal characteristic obtained from a remote device 20 or the object device 50 to a distance metric or other parameter in a variety of ways, including, for instance, a translation table for each fixed position device or type of fixed position devices, fingerprinting or other heuristic (e.g., a machine learned translator). Additional examples of such a translation are described in U.S. Pub. 2020/0137817, entitled SYSTEM AND METHOD OF DETERMINING REAL-TIME LOCATION, filed Oct. 23, 2019, to Smith—the disclosure of which is hereby incorporated by reference in its entirety.

Figure 6:
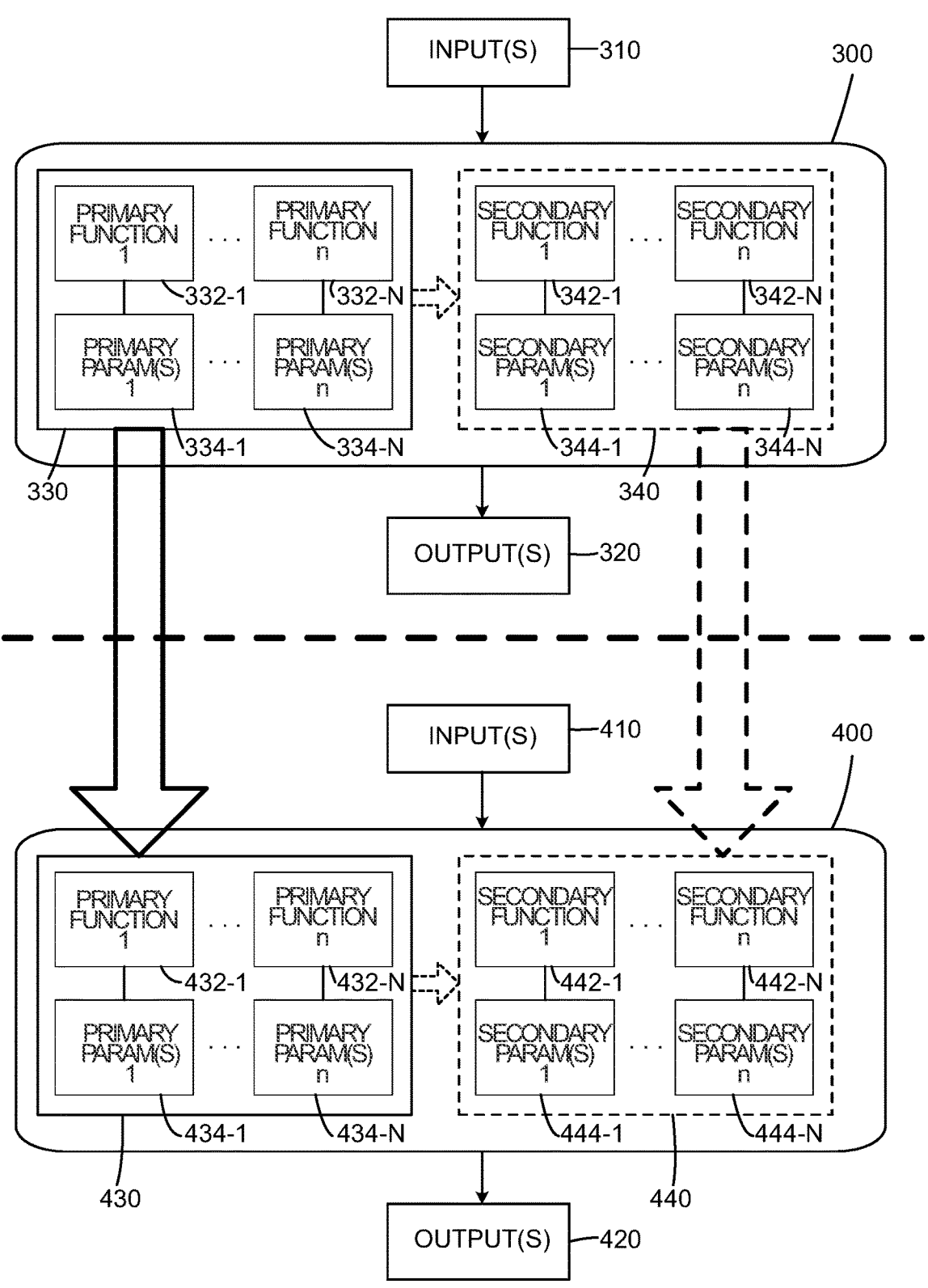
FIG. 6 shows representative views of first and second locators in accordance with one embodiment.

A first locator in accordance with one embodiment is shown in FIG. 6 and generally designated 300. The first locator 300, as described herein, may be configured to receive one or more inputs 310 and to generate one or more outputs 320 that may be indicative of a location of a portable device 20 relative to an object 10. The first locator 300 may include a first machine learned portion 330 that is trained based on truth data obtained with respect to a reference configuration. The reference configuration may include a portable device 20 that is classified according to a first device type and an object 10 that is classified according to a first object type.

In the illustrated embodiment, the first machine learned portion 330 may include one or more primary functions 332, such as one or more decision trees or one or more neural networks, or a combination thereof. The one or more primary functions 332 may be defined at least in part by one or more primary parameters 334 associated respectively with the one or more primary functions 332.

Optionally, the first locator 300 may include a second machine learned portion 340 that, similar to the first machine learned portion 330, is trained based on truth data obtained with respect to the reference configuration. The second machine learned portion 340 may include one or more secondary functions 342, such as one or more decision trees or one or more neural networks, or a combination thereof. The one or more secondary functions 342 may be defined at least in part by one or more secondary parameters 344 associated respectively with the one or more secondary functions 342. The second machine learned portion 340 may be operable to receive input from the first machine learned portion 330 or the inputs 310, or a combination thereof.

The first machine learned portion 330 of the first locator 300 may be trained and used in accordance with the method 1000 depicted in illustrated embodiment of FIG. 1. Training may include obtaining first truth data for a reference configuration, which in the illustrated embodiment includes a first vehicle type. The first truth data may include both the input 310 and the output 320 for training the first machine learned portion 330. Step 1004.

The first machine learned portion 330 may include one or more primary functions 332, and may be configured and trained according to the one or more parameters 334. The number of primary functions 332 may be initialized according to the one or more parameters 334. The initial state of the one or more primary functions 332 may be determined prior to training. As an example, the initial state of the one or more primary functions 332 may include random weights for an initial set of nodes of the one or more primary functions 332. Training of the first machine learned portion 330 may involve iteratively adjusting the state of the one or more primary functions 332 or the number of primary functions 332, or both. An example adjustment of the state of the one or more primary functions 332 may include changing a number of nodes of at least one of the one or more primary functions 332 and changing weights associated with each of the nodes of the one or more primary functions 332. As described herein, an error function and an error metric may be provided during training to compare the output of the first machine learned portion 330 of the first locator 300 against the truth information. Adjustments to the first machine learned portion 330 may be conducted based on the error metric, for example, to reduce or improve the error metric, to yield an output that is accurate within a target level of confidence.

In one embodiment, as described herein, a second machine learned portion 340 may be trained in conjunction with the first machine learned portion 330. The second machine learned portion 340 may be separate from the first machine learned portion 330 or receive output from the first machine learned portion 330, effectively forming an extension of the first machine learned portion 330.

For instance, as described herein, the one or more primary functions 332 may correspond to a chain of decision trees whose respective outputs (e.g., residuals) are provided to the next decision tree in the chain. The number of decision trees may increase during training of the second machine learned portion 340. The second machine learned portion 340 may correspond to a portion of this chain of decision trees, such that the chain of decision trees generated during training may comprise the one or more primary functions 332 and the one or more secondary functions 342, with an output of the last primary function 332-N of the first machine learned portion 330 being provided to the first secondary function 342-1 of the second machine learned portion 340.

The method 1000 may include incorporating the first locator 300 into a system 100 that aligns with the reference configuration, and using the first locator 300 to determine location information based on one or more inputs 310 obtained during operation. Steps 1006, 1008.

One embodiment according to the present disclosure may involve transfer learning of one or more aspects of the first locator 300 for use in training a second locator 400. For instance, these one or more aspects of the first locator 300 may form the basis or initial state for the second locator 400 prior to training.

A second locator in accordance with one embodiment is shown in FIG. 6 and generally designated 400. The second locator, as described herein, may be configured to receive one or more inputs 410 and generates one or more outputs 420 that may be indicative of a location of the portable device 20 relative to the object 10. The second locator 400 may include a first machine learned portion 430, and may optionally include a second machine learned portion 440.

A method of training the second locator 400 is shown in FIG. 1 and generally designated 2000. The method may include obtaining truth data for a second configuration different from the reference configuration. Step 2002 The differences may relate to a different type of portable device 20 or a different object type of object 10, or both. The method may also include transferring an aspect of the first locator 300 for use as a basis for training the second locator 400.

In the illustrated embodiment, the first machine learned portion 330 of the first locator 300, or a portion thereof, may be transferred to the first machine learned portion 430 of the second locator 400. Step 2004. After training, the second locator 400 may be incorporated into a system 100 as described herein, such as a system for locating a portable device 20 relative to a vehicle 10. Step 2006. The second locator 400 may be utilized in this configuration for determining a range of the portable device 20 relative to the vehicle 10 based on one or more inputs obtained in the system 100 during use. Step 2008.

The first machine learned portion 430 of the second locator 400 may be trained with an initial state of the first machine learned portion 430 corresponding to the first machine learned portion 330 of the first locator 300, or a portion thereof. For example, as depicted in FIG. 6, the first machine learned portion 330 may be transferred to the second locator 400 as the first machine learned portion 430. As described herein, the first machine learned portion 430, from this initial state, may be trained based on truth information obtained with respect to a configuration different from the reference configuration used for obtaining truth information in conjunction with the first locator 300. It is to be understood that transfer of machine learning aspects from the first locator 300 may include the first machine learned portion 330, or aspects thereof such as one or more of the primary functions 332 and one or more of the parameters 334, or a combination thereof. Additionally, or alternatively, the transfer of machine learning aspects from the first locator 300 may include the second machine learned portion 340, or aspects thereof such as one or more of the secondary functions 342 and one or more of the parameters 344, or a combination thereof.

The second locator 400 may be trained in a manner similar to the first locator 300, with the exception of being trained or configured, or both based on machine learning aspects obtained from the first locator 300. As an example, the first machine learned portion 330 of the first locator 300 may be transferred to the second locator 400 as the first machine learned portion 430 of the second locator 400. One or more aspects of the first machine learned portion 430, from the initial state of transference, may be modified or left frozen during training of the second locator 400.

In one embodiment, the first machine learned portion 430 may be frozen in its initial state after transference, with training of the second locator 400 including generating the second machine learned portion 440. For instance, an output of the first machine learned portion 430, such as an output of the primary function 432-N, may be provided as an input to the second machine learned portion 440, such as an input to the secondary function 442-1. As described herein in conjunction with the illustrated embodiment of FIG. 5, the primary function 432 and the secondary function 442 may correspond to a chain of decision trees, with the output of the chain of decision trees defined by a plurality of primary functions 432 to being supplied as an input to the chain of decision trees defined by the plurality of secondary functions 442.

In one embodiment, one or more aspects of the first machine learned portion 430 may be modified during training of the second locator 400. For instance, the number of nodes, the weights associated the nodes, and parameters 434 may be varied during training of the second locator 400. As an example, in the illustrated embodiment of FIG. 6, a plurality of primary functions 432 may correspond to a chain of decision trees. The nodes or weights of each decision tree may be varied during training (including pruning) in order to affect an error metric generated with respect to a comparison between an output of the locator 400 and the truth information. In one embodiment, each of the primary functions 432 in the illustrated embodiment of FIG. 4 may correspond to a primary function 532 of the locator 500 (e.g., each of the primary functions 432 may correspond to a decision tree) described in conjunction with FIG. 5. Additionally, or alternatively, each of the secondary functions 442 of the locator 400 may also correspond to a primary function 532 of the locator 500.

In one embodiment, the second machine learned portion 440 may be trained in a similar manner as described herein, including varying a number of nodes, weights, and parameters 434, or a combination thereof. The initial state of the second machine learned portion 440 may be random, similar to the initial state of the second machine learned portion 340 of the first locator 300. Alternatively, one or more aspects of the second machine learned portion 340 of the first locator 300 may be transferred to the second machine learned portion 440 to be used as an initial state for training of the second locator 400.

The location information output from a locator in accordance with one embodiment may include positional information or a zone classification, or both. Positional information may correspond to a coordinate (absolute or relative) or a distance relative to a reference point. The reference point may be defined as the location of the device in which the locator is provided, or another location of the object. One or more locators may use the same or different reference points. The zone classification may correspond to a region of space defined with respect to the vehicle, such as the zones described herein. First and second zones of the available zone classifications may be defined relative to each other in a variety of ways. For instance, the first and second zones may or may not intersect. As another example, the second zone may be a proper subset of the first zone (e.g., the second zone may be smaller and contained within the first zone). Any locator described herein may be configured to provide location information in the form of positional information or a zone classification, or both.

Figure 5:
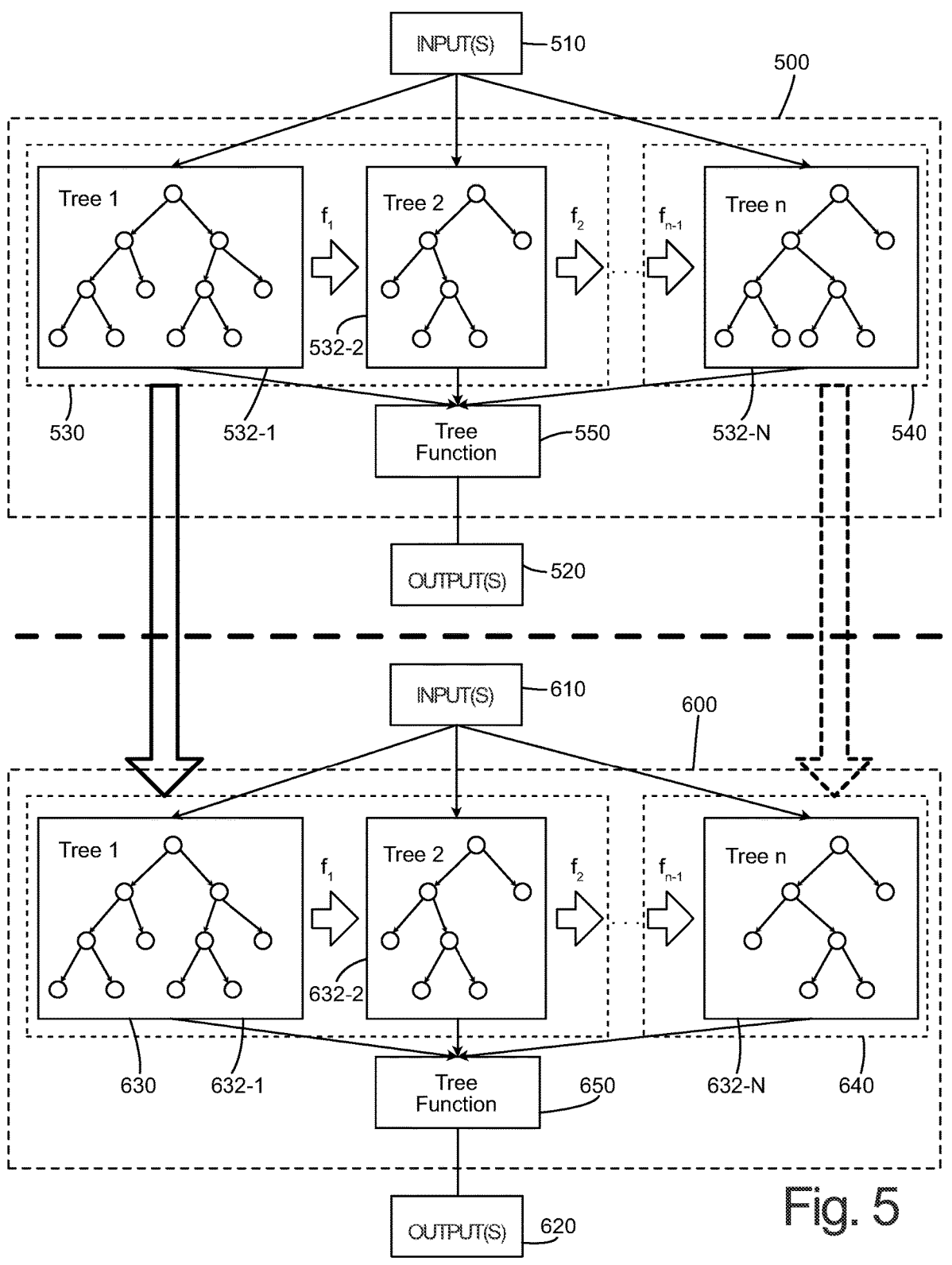
FIG. 5 shows representative views of first and second locators in accordance with one embodiment.

A first locator 500 and a second locator 600 in accordance with one embodiment are depicted in FIG. 5. The first and second locators 500, 600 may be configured to receive one or more inputs 510, 610, such as one or more signal characteristics of wireless communications transmitted by the portable device 20 and received by one or more remote devices 40 and/or the object device 50. The inputs may be translated to one or more outputs 520, 620 corresponding to the location information.

It should be understood that the inputs 510, 610 are not limited to signal characteristics of wireless communications. The inputs 510, 610 may include one or more measurements of characteristics or parameters other than wireless communications. Additionally, or alternatively, the inputs 510, 610 may be indicative of a state of the object 10 or another device in the system 100. For instance, in the context of a vehicle, one or more of the inputs 510, 610 may indicate that one or more of the vehicle doors are open or closed, or whether a window is open or closed.

The first and second locators 500, 600 in the illustrated embodiment may be incorporated into at least one of the object device 50 and a remote device 40. For instance, the controller 200 of the object device 50 may incorporate one or both of the first and second locator 500, 600, and be communicatively coupled to one or more of the remote devices 40 via the communication interface 214.

The first and second locators 500, 600, as described herein may include a first machine learned portion 530, 630 and a second machine learned portion 540, 640 configured to receive the one or more inputs 510, 610 and to facilitate generation of the one or more outputs 520, 620 in conjunction with a tree function 550, 650 indicative of a location of the portable device 20 relative to the object 10. The tree functions 550, 650 may be configured to synthesize the outputs of the plurality of locator functions 532, such as by summing the outputs of the locator functions 532. It should be understood that the present disclosure is not so limited, and that any type of function may be utilized as the tree function 550, 650 to generate the one or more outputs 520, 620.

As discussed herein, the one or more inputs 510, 610 may vary from application to application. Examples of inputs 510, 610 include one or more signal characteristics of the communications, such as signal strength (RSSI), angle of arrival (AOA), time of flight (TOF), or any other signal or input described herein including derived signals or inputs, or any combination thereof.

The first and second locators 500, 600 in one embodiment may translate the signal characteristic obtained from a remote device 40 or the object device 50 to a distance metric or other parameter in a variety of ways.

In a vehicle or other type of object, there may be many antennas in accordance with one embodiment of the system 100, where each of the antennas may be in a different location with a different orientation or polarization. All or a subset of the antennas and associated devices, such as the object device 50 or the remote device 40, may facilitate obtaining RSSI, angle of arrival, time of flight, or other, or any combination thereof, measurements simultaneously. Another type of object may be an ATM with a plurality of antennas (e.g., 4 antennas). Yet another type of object may be a store room with a plurality of antenna (e.g., 20 antennas).

Because a variety of factors can affect one or more signal characteristics of communications between a receiver and a transmitter, to facilitate tuning the first and second locator 500, 600 under a variety of conditions or configurations.

The first locator 500 may be trained in accordance with a reference configuration that includes a reference object type (e.g., a reference vehicle) and a reference device type (e.g., a reference type of smart phone). Truth information may be obtained with respect to the inputs 510 and the outputs 520 for this reference configuration. Training of the first and second machine learned portions 530, 540 may be conducted based on this truth information. In the illustrated embodiment the first and second machine learned portions 530, 540 can comprise a chain of decision trees provided as locator functions 532. As can be seen, the chain of decision trees or chain of locator functions 532 are conceptually grouped according to the first and second machine learned portions 530, 540 for purposes of disclosure. As described herein, the first machine learned portion 530, and optionally the second machine learned portion 540, may be transferred to the second locator 600 for training thereof.

During training of the locator functions 532, the number of locator functions 532 and the structure of the locator functions 532 may be varied in order to reduce or improve an error metric with respect to the truth information and the output 520 generated during training. Additional or alternative constraints may be provided in conjunction with training, including, for example, an execution time or performance constraint or a size constraint, or both.

In one example, for the decision tree of the locator function 532-1, the number of nodes, the weights or parameters for each of the nodes, and the tree structure defined by the nodes may be varied during training to improve the error metric. The output of the locator function 532-1 may be provided as an input to both the tree function 550 and the downstream locator function 532-2. Training and definition of the locator functions 532 as well as the tree function 550 may be conducted according to an XGboost system—however, it is to be understood that alternative configurations and training systems may be implemented.

The second locator 600 may be configured for a configuration different from the reference configuration of the first locator. For instance, one or both of the object type and the device type may be varied for the configuration associated with the second locator 600. Truth information may be obtained with respect to this configuration associated with the second locator 600, and this truth information may be utilized for training of the second locator 600.

In the illustrated embodiment, one or both of the first and second machine learned portions 530, 540 may be transferred to the second locator 600, respectively as the first and second machine learned portion 630, 640. Aspects transferred from the first locator 500 may be used as an initial state for the second locator. Additionally, one or more of such aspects may be frozen or modified during training of the second locator 600. For example, the first machine learned portion 530 may be transferred as an initial state for the first machine learned portion 630 of the second locator. The first machine learned portion 630 in this initial state may be frozen, and during training of the second locator 600, the second machine learned portion 640 may be modified in order to improve the error metric with respect to truth information used during training. As another example, the first machine learned portion 630 may be modified during training in order to improve the error metric with respect to the truth information. Example modifications include varying the structure of a decision tree (e.g., growing or pruning), varying one or more weights of nodes of the decision tree, and changing the number of decision trees provided in the first machine learned portion 630.

The locator functions 632 of the first machine learned portion 630 may correspond to the primary functions 432 of the first machine learned portion of the locator 400, and the locator functions 632 of the second machine learned portion 640 may correspond to the secondary functions 442 of the second machine learned portion 640. Likewise, the locator functions 532 of the first machine learned portion 530 may correspond to the primary functions 332 of the first machine learned portion of the locator 300, and the locator functions 532 of the second machine learned portion 540 may correspond to the secondary functions 342 of the second machine learned portion 540.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A system for determining location information pertaining to a location of a portable device relative to an object, the portable device being a first device type, the object being a first object type, the first device type and the first object type defining an active configuration type, said system comprising:

an object device disposed in a fixed position relative to the object, the object device having an antenna configured to communicate wirelessly with the portable device via a communication link;

a controller configured to determine location information about the portable device relative to the object, the controller including a locator configured to generate the location information based on a signal characteristic of communications received by the antenna from the portable device; and the locator including a first machine learned portion, the first machine learned portion including a portion that is initially trained based on first truth information obtained with respect to a reference configuration type different from the active configuration type, the first machine learned portion being subsequently trained based on second truth information obtained with respect to the active configuration type, wherein an object configuration of the object varies over time such that the object is the first object type at a first time and the object is a second object type at a second time, wherein a third configuration type is defined by the first device type and the second object type.

2. The system of claim 1 wherein the first machine learned portion corresponds to a first decision tree that is trained sequentially based on the first and second truth information.

3. The system of claim 1 wherein a reference object type of the object and a reference device type of the portable device define the reference configuration type.

4. The system of claim 3 wherein:

the second truth information provided as a basis for training the first machine learned portion is based on communication between a test portable device and a test object;

the test portable device is classified according to the first device type such that the test portable device is the same type as the portable device; and the test object is classified according to the first object type such that the test object is the same type as the object.

5. The system of claim 3 wherein at least one of the reference object type and the reference device type that define the reference configuration type is different respectively from the first object type and the first device type that define the active configuration type.

6. The system of claim 1 comprising memory that stores a third machine learned portion that is trained based on third truth information obtained with respect to the third configuration type.

7. The system of claim 6 wherein the third machine learned portion is based on a) the portion of the first machine learned portion that is initially trained based on the first truth information and b) the first machine learned portion being subsequently trained based on the third truth information obtained with respect to the third configuration type.

8. The system of claim 7 wherein the locator is reconfigurable to include the first and third machine learned portions, and wherein the locator is configured to determine the location information about the portable device relative to the object based on the first and third machine learned portions.

9. The system of claim 1 wherein:

a fourth configuration type is provided that is defined by the first object type and an alternative portable device being a second device type different from the first device type;

the system comprises memory that stores a fourth machine learned portion that is trained based on fourth truth information obtained with respect to the fourth configuration type; and the locator is reconfigurable to include the fourth machine learned portion, and wherein the locator is configured to determine the location information about the portable device relative to the object based on the fourth machine learned portion.

10. The system of claim 1 comprising the locator including a second machine learned portion, a portion of the second machine learned portion being initially trained based on the first truth information obtained with respect to the reference configuration type different from the active configuration type, wherein the locator is configured to determine the location information based on the first machine learned portion and the second machine learned portion.

11. A method for training a locator configured to determine a location of a portable device relative to an object, the portable device being a first device type, the object being a first object type, the first device type and the first object type defining an active configuration type, said method comprising:

training a first portion of the locator based on first truth information obtained with respect to a reference configuration type different from the active configuration type;

subsequently training the first portion based on second truth information obtained with respect to the active configuration type; and varying an object configuration of the object over time such that the object is the first object type at a first time and the object is a second object type at a second time, and wherein a third configuration type is defined by the first device type and the second object type.

12. The method of claim 11 wherein the first portion corresponds to a first decision tree that is trained sequentially based on the first and second truth information.

13. The method of claim 11 wherein a reference object type of the object and a reference device type of the portable device define the reference configuration type.

14. The method of claim 13 wherein:

the second truth information provided as a basis for training the first portion is based on communication between a test portable device and a test object;

the test portable device is classified according to the first device type such that the test portable device is the same type as the portable device; and the test object is classified according to the first object type such that the test object is the same type as the object.

15. The method of claim 13 wherein at least one of the reference object type and the reference device type that define the reference configuration type is different respectively from the first object type and the first device type that define the active configuration type.

16. The method of claim 11 comprising training a second portion of the locator trained based on the first truth information obtained with respect to the reference configuration type different from the active configuration type, wherein the locator is configured to determine the location based on the first portion and the second portion.

17. The method of claim 11 comprising training a third portion of the locator based on third truth information obtained with respect to a third configuration type defined by the first device type and a second object type.

18. The method of claim 17 wherein the locator is reconfigurable to include the first portion and the third portion, and wherein the locator is configured to determine the location about the portable device relative to the object based on at least one of the first and third portion.

* * * * *